May 23, 1950  R. W. BAILEY ET AL  2,509,123
NUT RUNNER
Filed Sept. 18, 1944  10 Sheets-Sheet 4
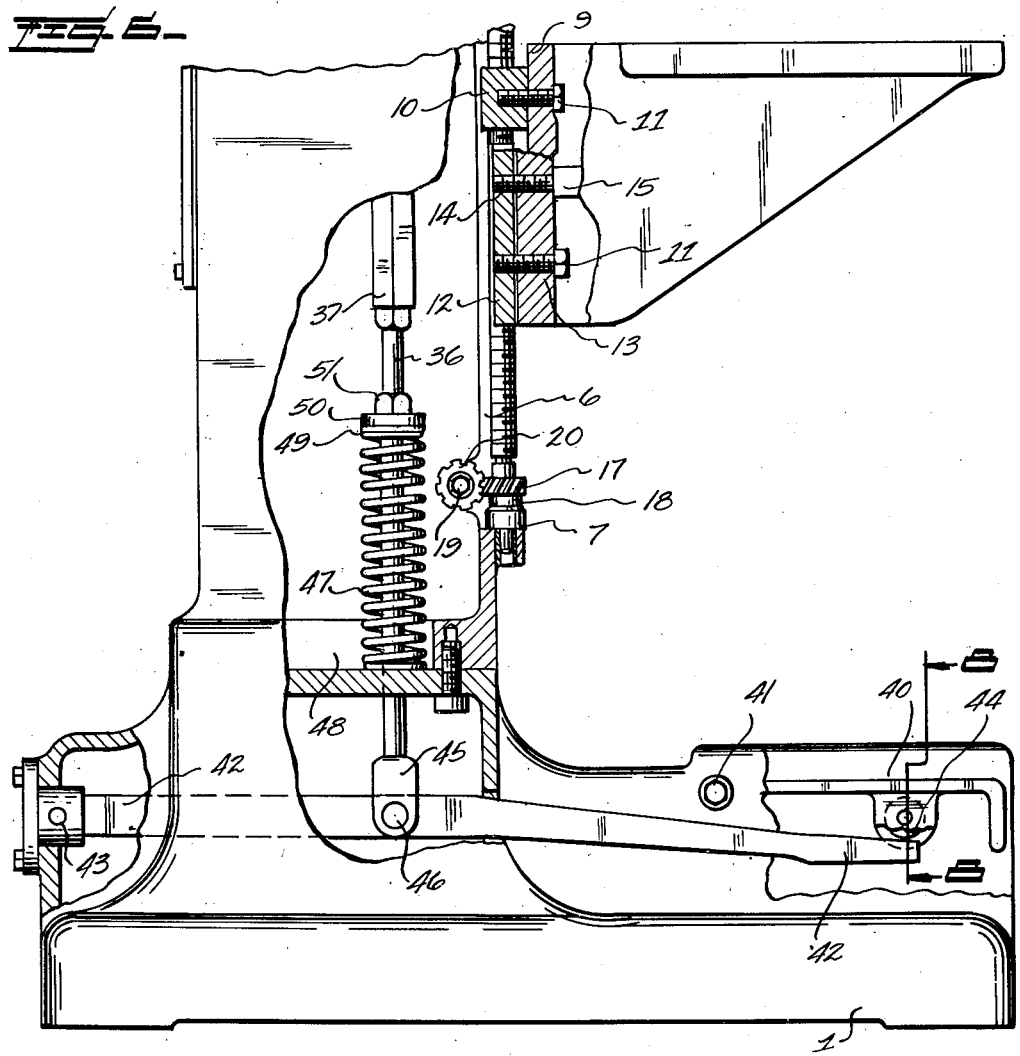
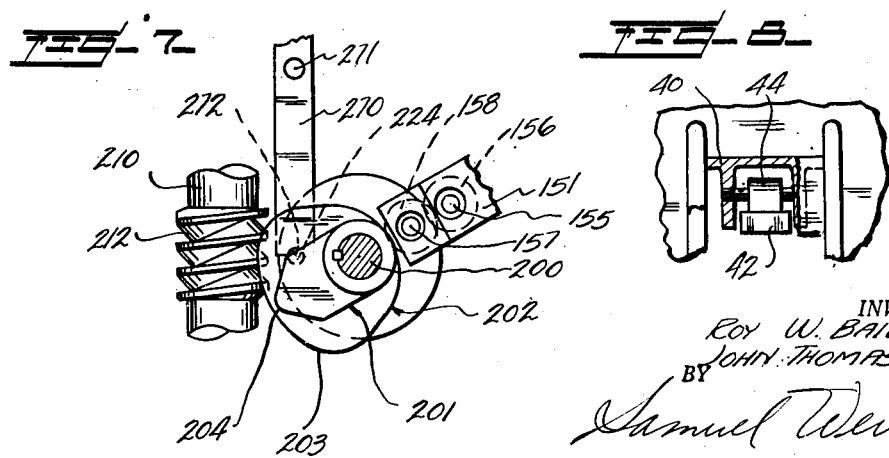
INVENTORS.
ROY W. BAILEY.
JOHN THOMAS FAULL.
BY Samuel Weisman

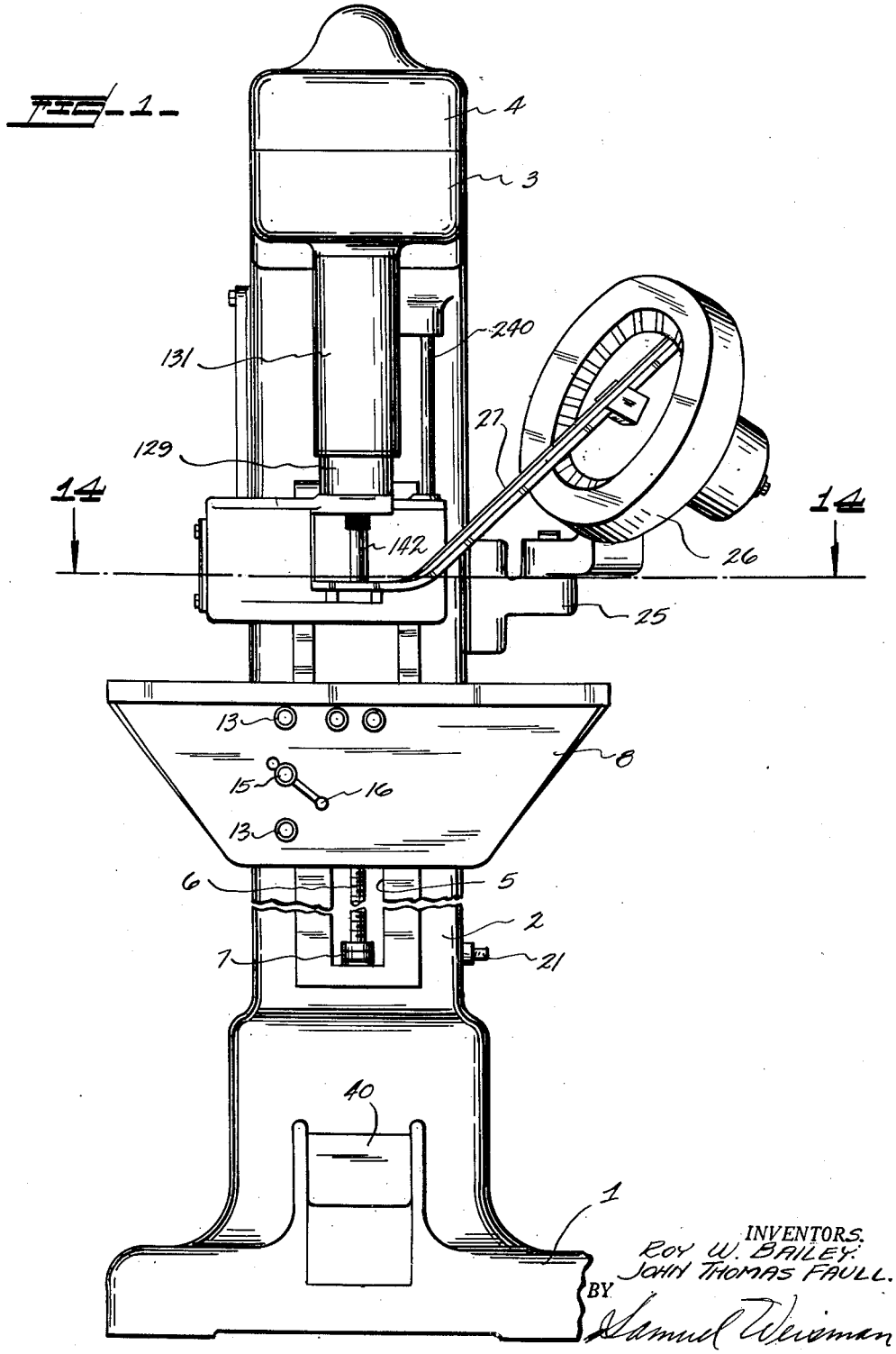

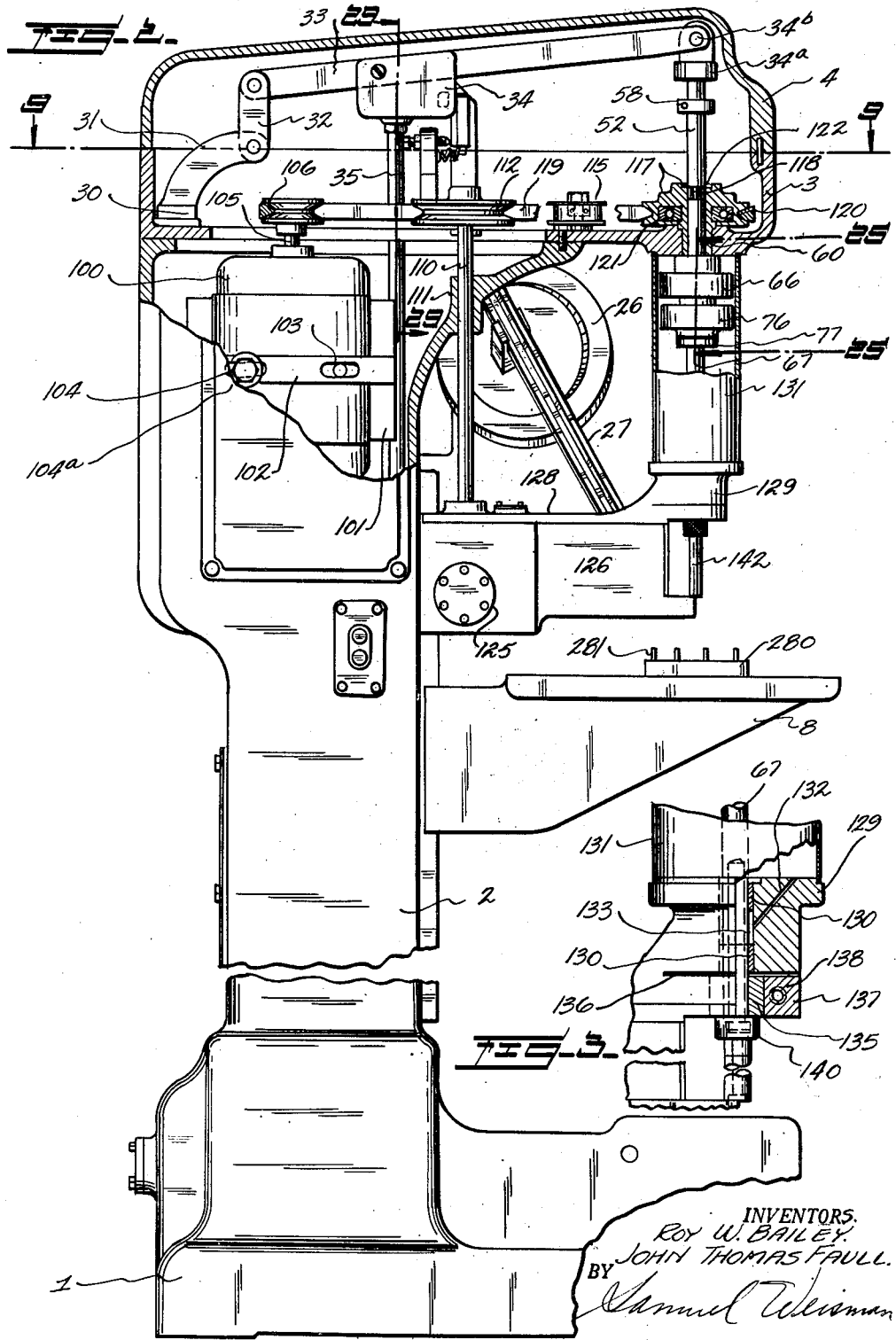

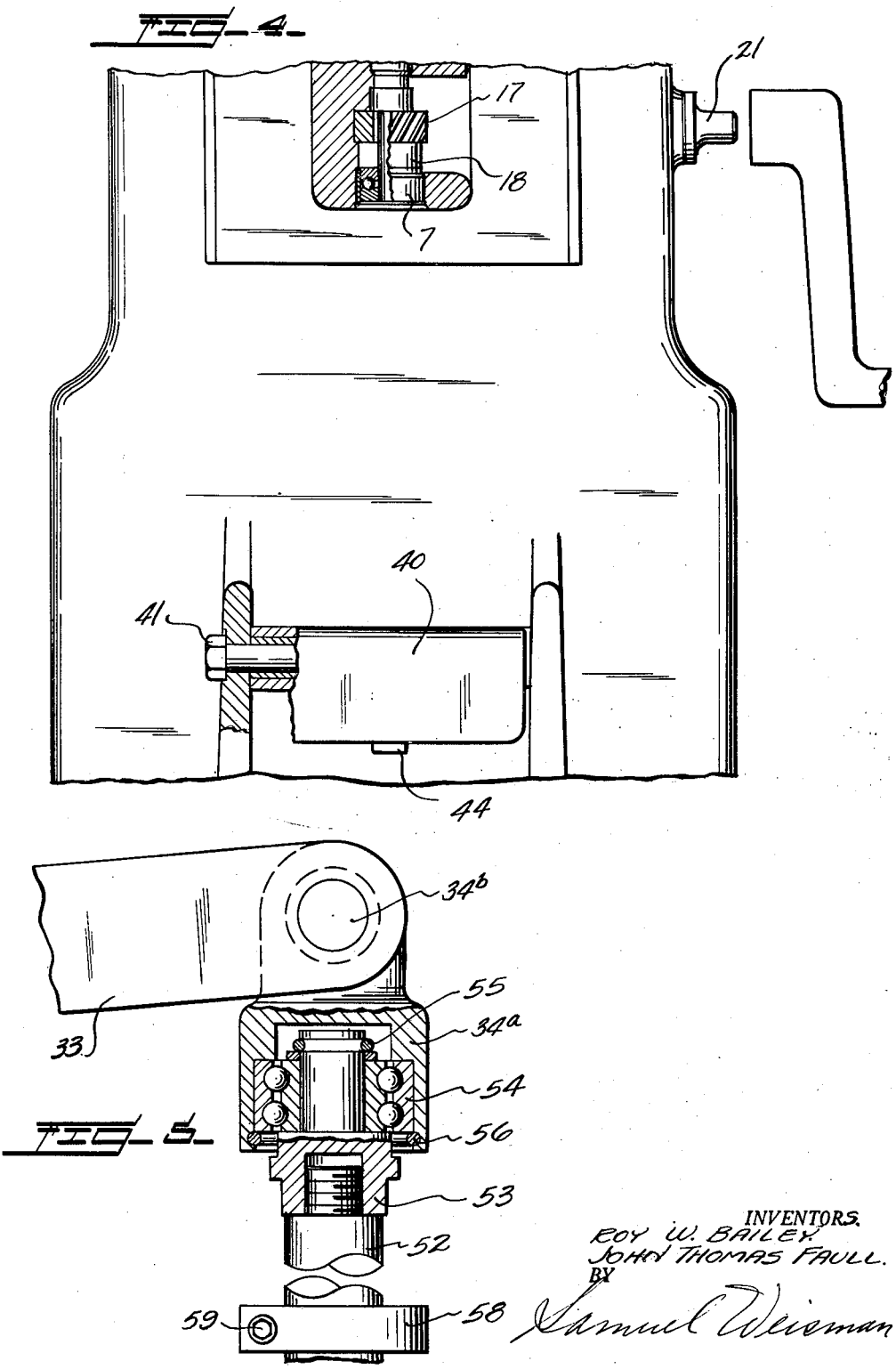

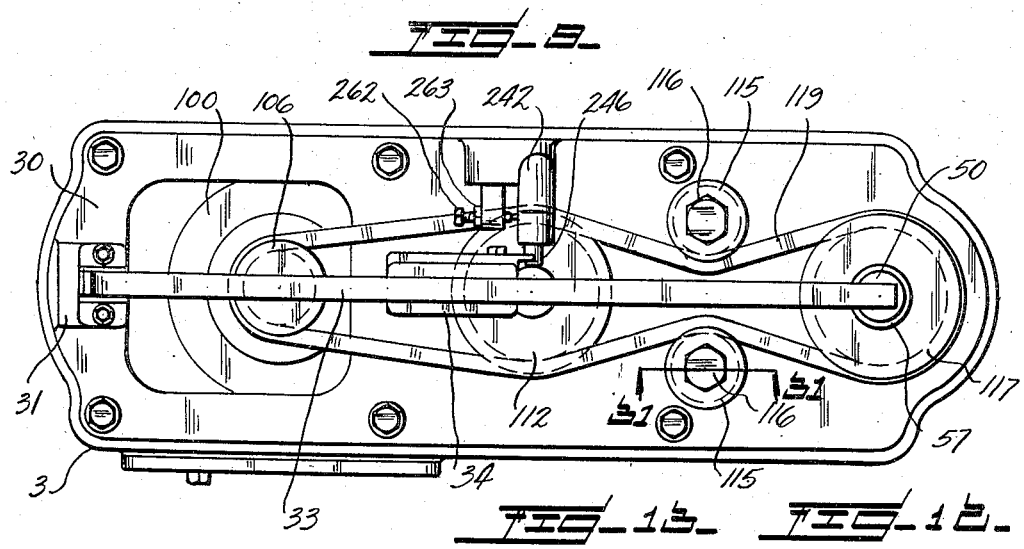
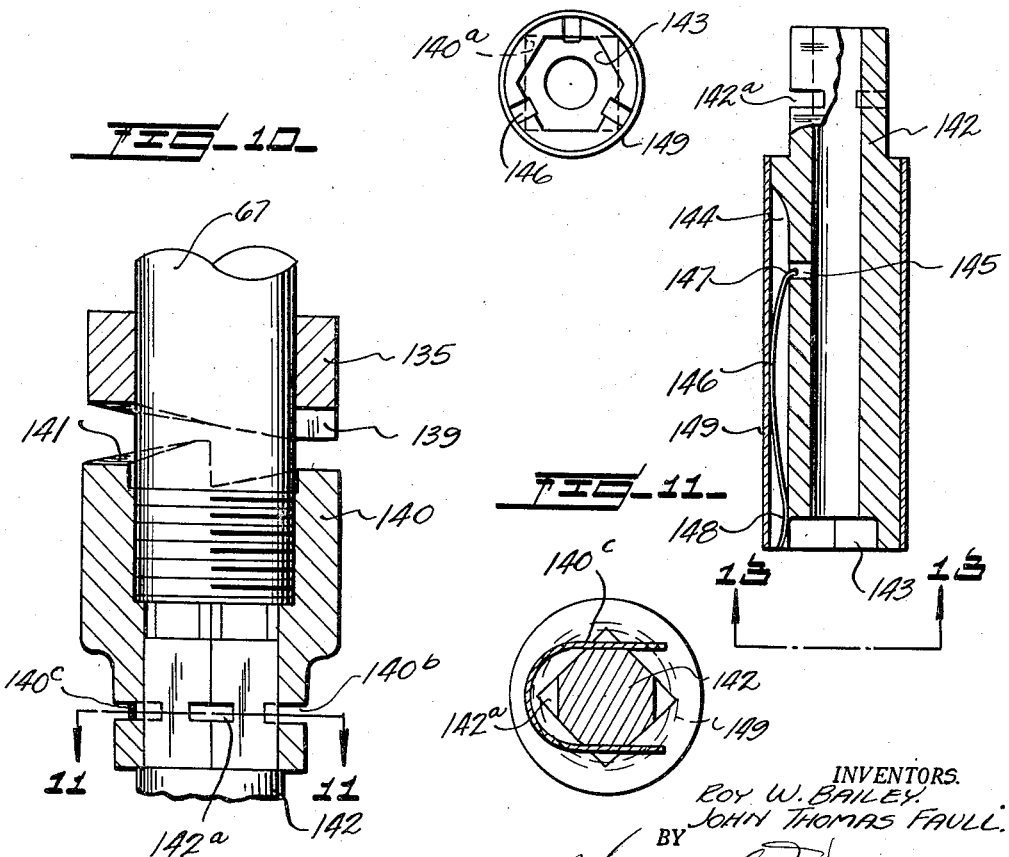

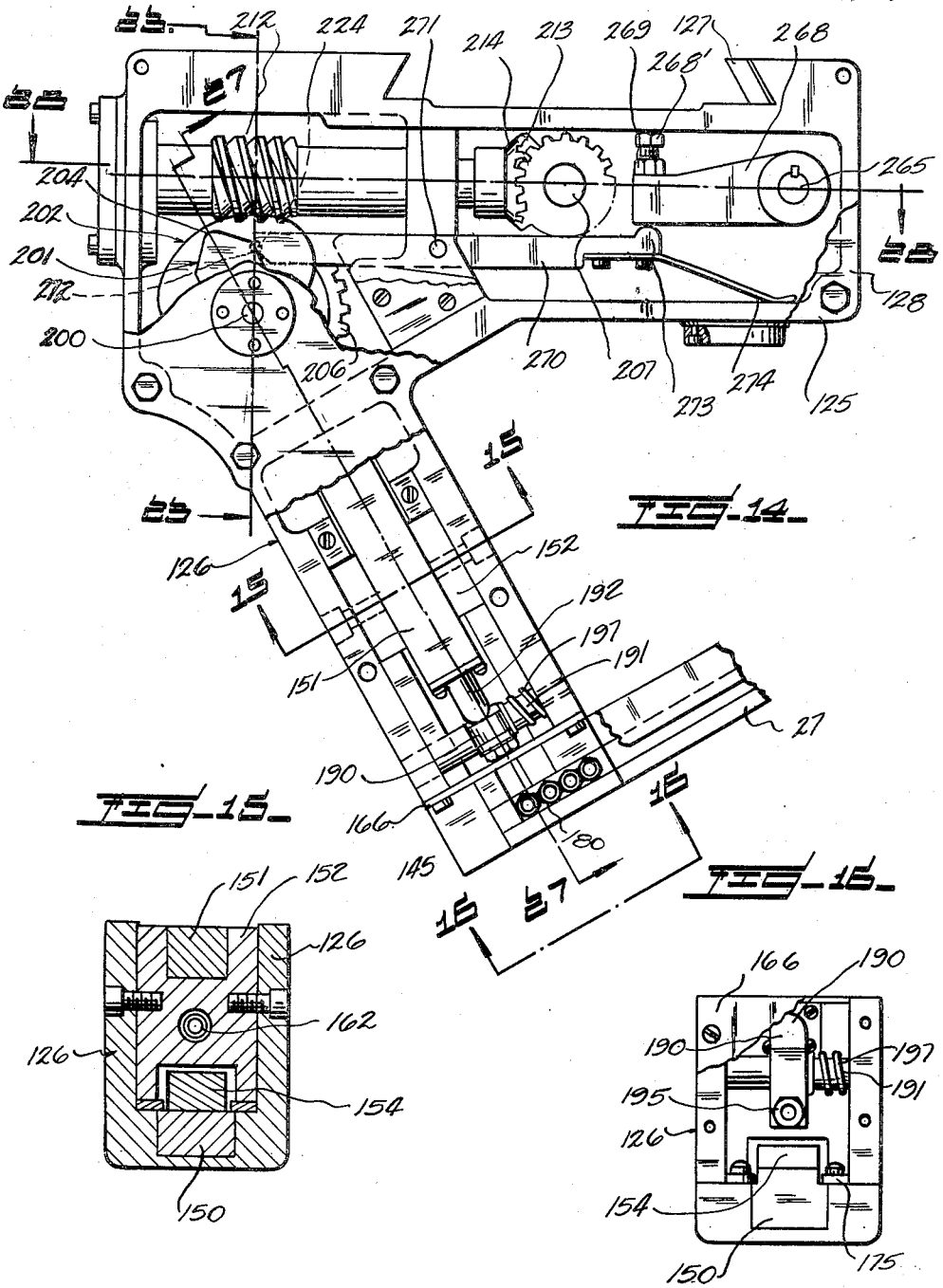

May 23, 1950   R. W. BAILEY ET AL   2,509,123
NUT RUNNER
Filed Sept. 18, 1944   10 Sheets-Sheet 7
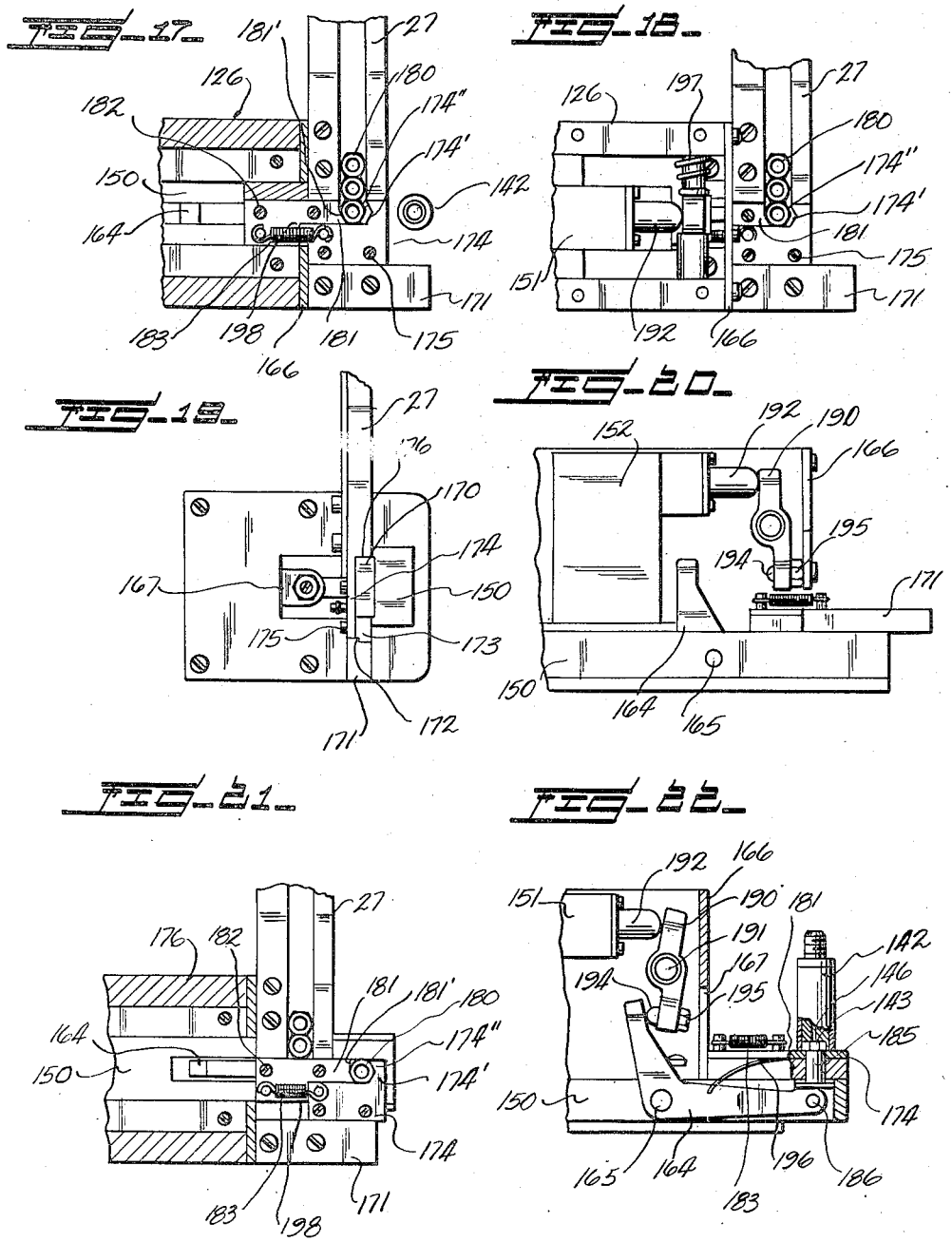
INVENTORS.
ROY W. BAILEY.
JOHN THOMAS FAULL.
BY
Samuel Wiseman

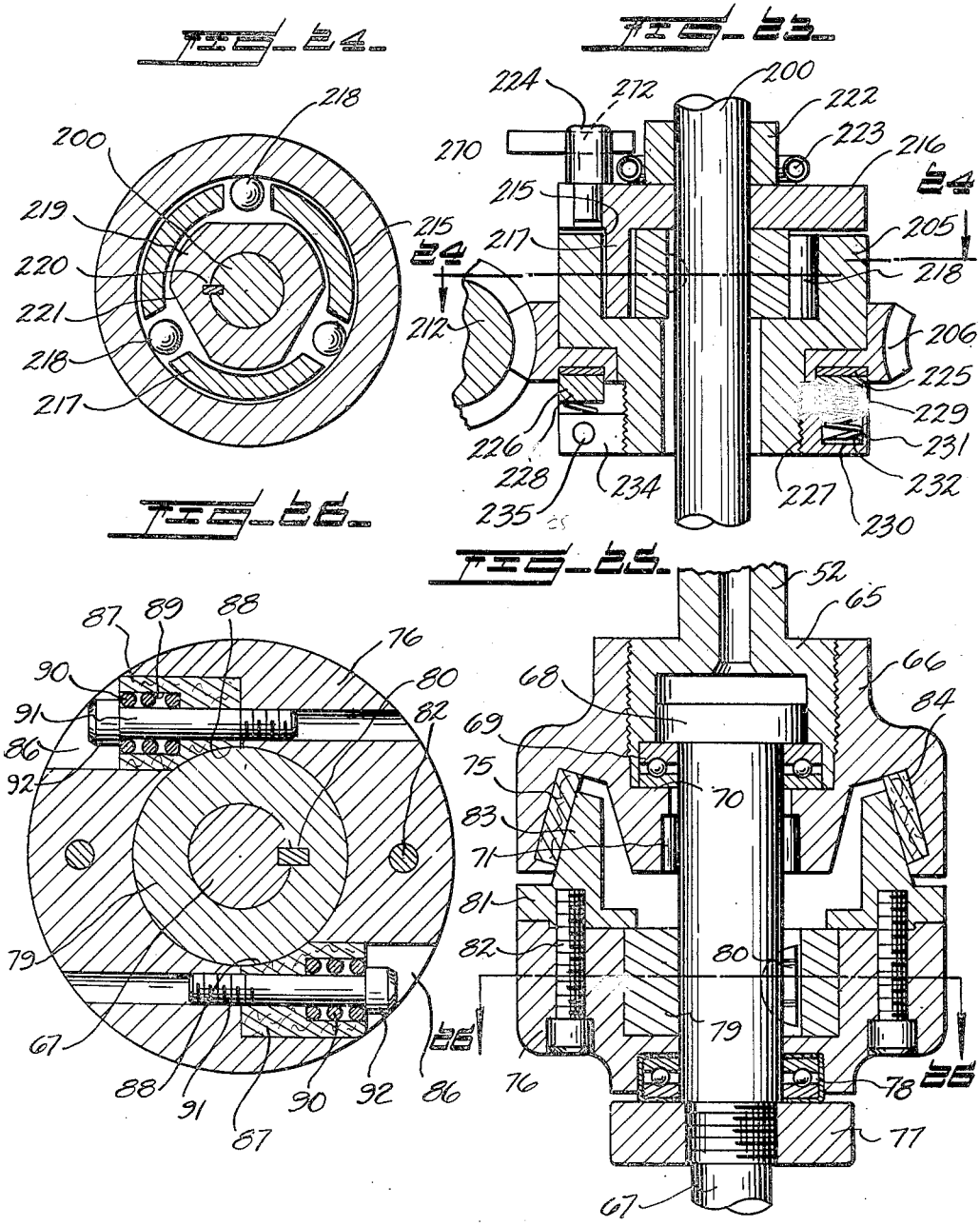

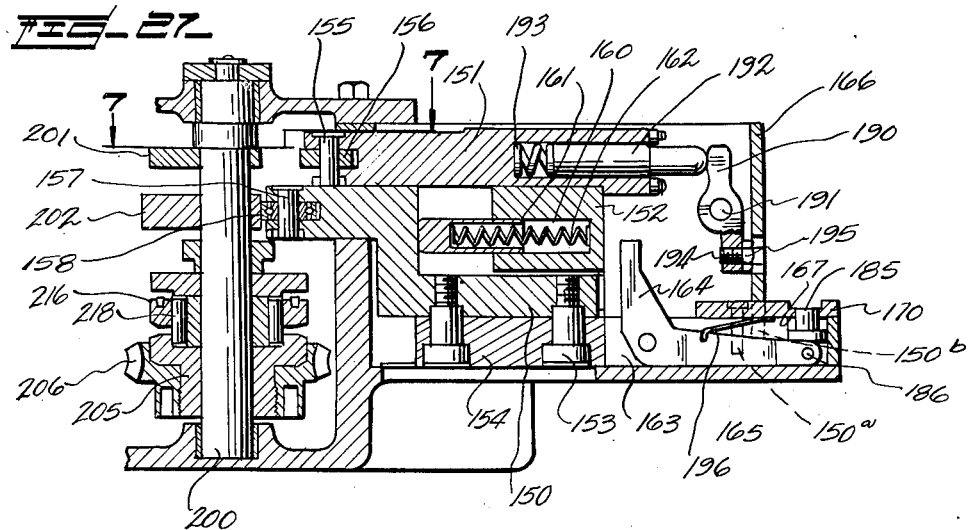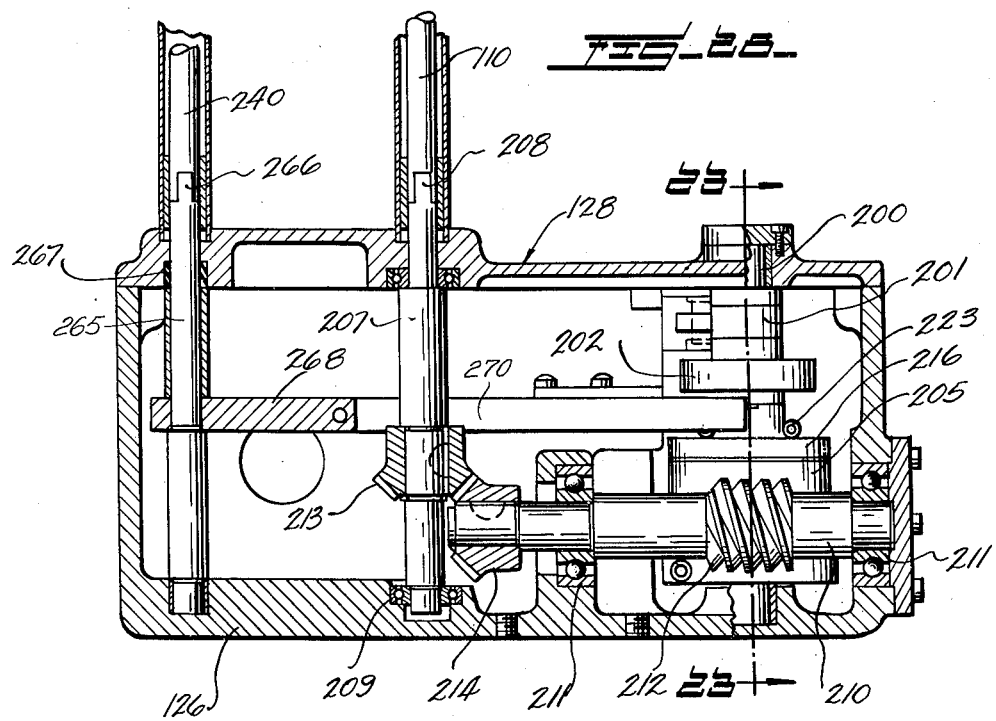

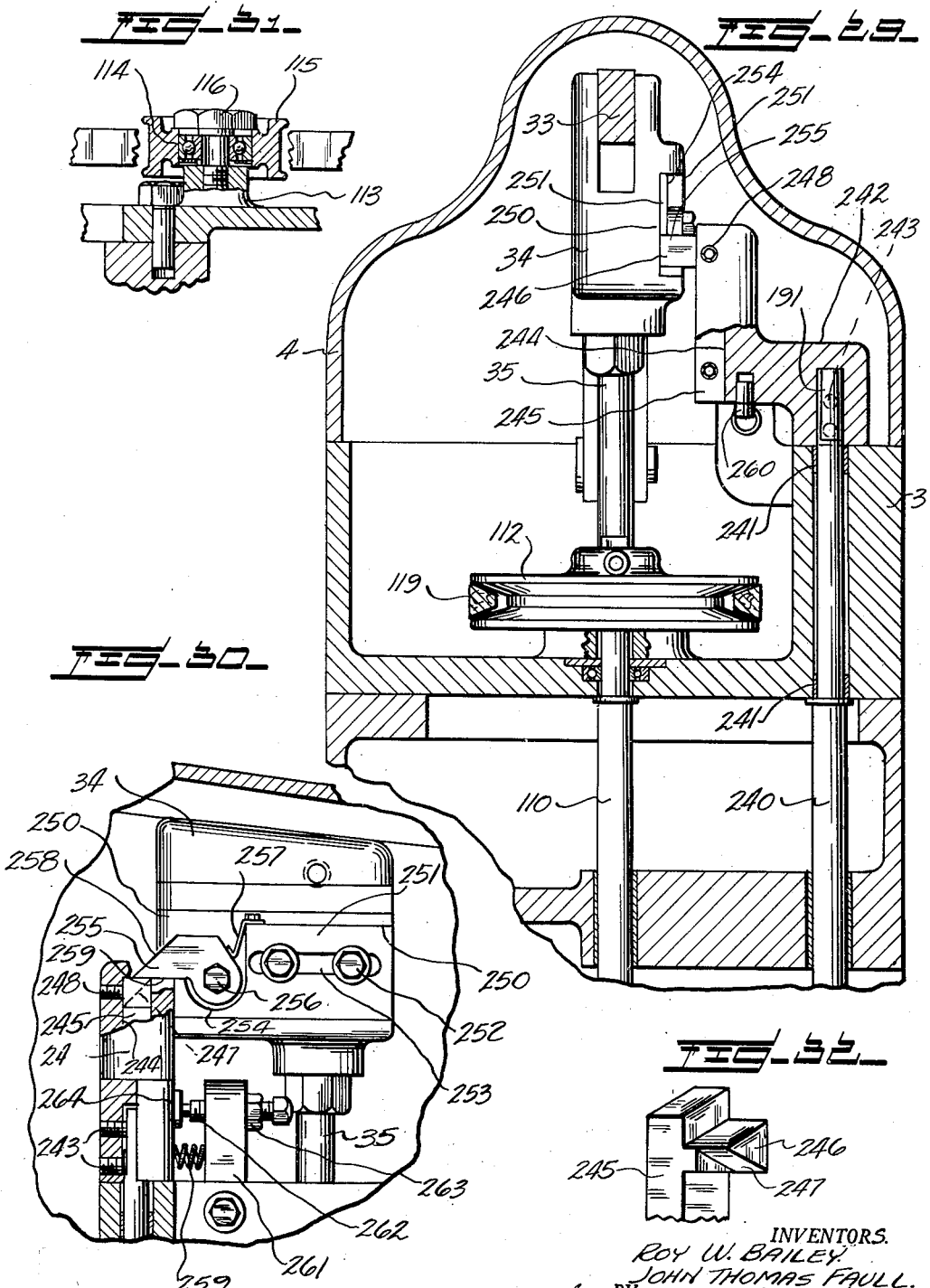

Patented May 23, 1950

2,509,123

UNITED STATES PATENT OFFICE 2,509,123

NUT RUNNER

Roy W. Bailey and John Thomas Faull, Detroit, Mich., assignors to Detroit Power Screwdriver Company, Detroit, Mich., a corporation of Michigan Application September 18, 1944, Serial No. 554,608

7 Claims. (Cl. 10—155)

The present invention pertains to a novel nut runner, that is, a machine for delivering nuts to a rotating wrench, inserting them individually in the wrench, and feeding the loaded wrench to the work in a manner to screw the nut on the work.

The principal object of the invention is to provide a machine that automatically performs these operations on actuation of a single control member such as a pedal.

The general nature of the novel machine can best be understood from a statement of the sequence of operation. A rotating and reciprocable spindle carries a wrench mounted over a table. The spindle and wrench are fed to the work by a suitable operating member such as a pedal and are returned by a spring. At the end of the return stroke, a spindle clutch disengages to interrupt the rotation, and the wrench engages a positive stop to permit insertion of a nut.

While the wrench is spaced from the work and stopped, a nut positioning and injector mechanism comes into operation. This mechanism includes a pair of slidable jaws that first receive a nut from a delivery track spaced laterally from the wrench. The jaws with a nut there between are next shifted to position the nut in alinement with the socket of the wrench. The injector mechanism, slidable with the jaws, then transfers the nut to the wrench socket.

The positioning and injector mechanism are actuated by cams on a clutch-controlled cam shaft. In order to provide for the necessarily periodic operation of the mechanism, the clutch is caused to engage only intermittently. A stop device holds the clutch disengaged against the action of a spring tending to engage the clutch. At the proper instant in the cycle, another cam mechanism operated by the return stroke of the actuating pedal releases the clutch stop, thereby effecting operation of the positioning and injector mechanism while the wrench is held stationary at a distance from the work. On the next operating movement of the actuating pedal, the spindle clutch is engaged, and the rotating spindle and wrench are fed towards the work to apply the nut on the work.

The invention also includes the subassemblies for performing distinct portions of the operation as herein described or claimed.

The invention is fully disclosed by way of example in the following description and in the accompanying drawings in which:

Figure 1 is a front elevation of the machine;

Figure 2 is a vertical section, partly in elevation;

Figure 3 is a detail of Figure 2;

Figure 4 is an enlarged detail, partly in section, of the lower end of Figure 1;

Figure 5 is an enlarged detail section of the upper portion of Figure 2;

Figure 6 is a vertical section, partly in elevation, at the base;

Figure 7 is a detail plan section;

Figure 8 is a section on the line 8—8 of Figure 6;

Figure 9 is a section on the line 9—9 of Figure 2;

Figure 10 is an enlarged vertical section of the wrench stop;

Figure 11 is a section on the line 11—11 of Figure 10;

Figure 12 is an enlarged vertical section of the wrench bit;

Figure 13 is a bottom plan view on the line 13—13 of Figure 12;

Figure 14 is a plan section approximately on the line 14—14 of Figure 1 and broken away;

Figure 15 is a section on the line 15—15 of Figure 14;

Figure 16 is a section on the line 16—16 of Figure 14;

Figure 17 is a plan section showing the receiving position of the positioning jaws;

Figure 18 is a corresponding plan view;

Figure 19 is a corresponding end view;

Figure 20 is a corresponding vertical elevation;

Figure 21 is a plan section showing the advanced position of the positioning jaws;

Figure 22 is a corresponding vertical elevation, partly in section;

Figure 23 is an axial section of the intermittent clutch, in the plane of the line 23—23 of Figures 14 and 28, Figure 24 is a section on the line 24—24 of Figure 23;

Figure 25 is an enlarged detail section on the line 25—25 of Figure 2;

Figure 26 is a section on the line 26—26 of Figure 25;

Figure 27 is a section on the line 27—27 of Figure 14;

Figure 28 is a section on the line 28—28 of Figure 14;

Figure 29 is a detail section on the line 29—29 of Figure 2;

Figure 30 is a corresponding elevation in a vertical plane perpendicular to that of Figure 29 and partly in section;

Figure 31 is a detail section of the idler pulley assembly shown in Figure 2, and Figure 32 is a detail perspective.

Reference to these views will now be made by use of like characters which are employed to designate corresponding parts throughout.

In Figure 1 is shown a machine base 1 on which is formed or built a column 2 in any suitable manner. At the upper end of the column is provided a head or a top arm 3 fitted with a cover 4.

The column is formed with a vertical slot 5 at which is mounted a vertical screw 6. The lower end of the screw is held in a suitable bearing 7 and the upper end may be similarly mounted. The screw supports a table 8 having a vertical wall 9 (Figure 6) adjacent to the slot 5. A table adjusting nut 10 is mounted on the screw 6 and fastened to the wall 9 by a suitable number of screws 11.

The rear wall 9 also carries a gib or clamp 12 held by upper and lower screws 13 and an intermediate lock screw 14 having a head 15 with a locking handle 16 passed therethrough. When the table is to be adjusted by turning the screw 6, the screw 14 is turned to loosen the gib 12. The lower end of the screw carries a spiral gear 17 held from the bearing 7 by a spacer collar 18. A horizontal shaft 19 journalled in the housing carries a spiral gear 20 meshing with the gear 17. The outer end 21 (Figure 1) of the shaft 19 is suitably shaped for engagement by a crank for rotating the screw 6 and adjusting the elevation of the table.

A bracket 25 mounted on the column 2 supports a rotary hopper 26 adapted to feed nuts into a track 27 which delivers them to a location above the table 8 and to a power driven socket wrench as will presently be described. The hopper and track are fully disclosed in United States Patent No. 2,060,182 of November 10, 1936, and require no detailed description here.

On a shelf 30 (Figure 2) in the top arm 3 is secured a fulcrum bracket 31 having one end of a link 32 pivotally attached thereto. To the other end of the link is pivoted one end of a spindle lever 33 having a spindle suspended from its other end, as will presently be described. A head 34 is attached to an intermediate point of the spindle lever and has the upper section 35 of an actuating rod connected to and suspended therefrom. The lower section 36 is connected to the upper section 35 by a turnbuckle 37, both sections being threaded for this purpose.

On the base 1 is mounted a pedal 40 (Figures 1 and 6) by means of a pivot pin 41. A pedal-operated lever 42 is fulcrumed in the base on a pivot pin 43 remote from the pedal 40. The pedal carries a roller 44 riding on the nearer or free end of the lever 42. A clevis 45 on the lower end of the lower rod 36 is attached to an intermediate point of the lever 42 by a pin 46.

A portion of the lower rod 36 is surrounded by a coil spring 47 standing in a recess 48 formed in the upper side of the base 1. The upper end of the spring bears against a thrust washer 49 carried by an adjusting collar 50 which in turn is stopped against a nut 51 on the threaded part of the lower rod 36. It is now evident that the spring 47 holds the spindle lever normally in an elevated position and that the lever is lowered by pressure on the pedal 40.

To the free end of the spindle lever 33 is attached a thrust bearing housing 34ᵃ by a pin 34ᵇ (Figure 2). An upper spindle 52 has its upper end screwed into an adapter 53 which in turn is held in the radial thrust bearing 54 by a snap ring 55. The bearing 54 is retained in the housing 50 by a snap ring 56. The upper portion of the upper spindle 52 carries a stop collar 58 adjustably secured by a socket head set screw 59 (Figure 5) to limit downward movement of the spindle, as will presently appear. The lower portion of the upper spindle 52 is journalled in a bearing 60 (Figure 2) fitted in the top arm 3.

Beneath the top arm 3, the lower end of the upper spindle is enlarged and threaded at 65 (Figure 25) to receive an upper clutch plate housing 66. The lower spindle 67 is suspended by a head 68 on its upper end resting on a thrust bearing 69 which lies on a shoulder 70 formed in the housing 66. The housing also contains needle bearings 71 engaging the upper portion of the lower spindle.

The bottom of the housing 66 is formed with an anular recess 75 having upwardly converging walls. At a lower position on the lower spindle is mounted another housing 76 resting on a stop collar 77, with a thrust bearing 78 interposed. Within the housing 76 is a clutch friction collar 79 keyed to the lower spindle at 80 for a purpose that will presently appear. Upon the housing 76 is a clutch member 81 secured by studs 82. The member 81 is formed with a clutch ring 83 having upwardly converging sides and received spacedly in the cavity 75. A leather facing 84 is secured to the outer wall of the cavity 75 to engage the ring 83.

The member 76 is formed with a pair of axially parallel recesses 86 on opposite sides of a diameter. In each recess is placed a fiber friction plug 87, which is modified to form an arcuate surface 88 engaging the periphery of the friction collar 79. The plugs are counterbored to form a cavity 89 in which is seated a coil spring 90. A stud 91 is passed through each series and is screwed into the body of the member 76. One end of the spring bears against the friction plug and the other end against the head 92 of the stud, whereby the friction plugs are held edgewise in frictional engagement with the clutch friction collar 79.

In the operation of this portion of the device, downward pressure on the upper spindle 52 through operation of the pedal 40 brings the clutch housing 66 into driving engagement with the tapered clutch ring 83 at the facing 84. The drive is transmitted through the plate 81, housing 76 and fiber plugs 87 to the collar 79 and lower spindle 67. When the load on the lower spindle exceeds a predetermined maximum, a slip occurs between the periphery of the collar 79 and the modified edges 88 of the plugs 87, so that the lower spindle remains stationary. This maximum load is determined by the tension of the springs 90 which is set by the studs 91.

Power for the machine is furnished by an electric motor 100 supported by a motor mounting plate 101 carried by the column 2. The motor carries an adapter plate 102 having elongated slots 103 and is adjustably held by headed screws 104 passed through the plate 101 and slots 103 into the square nuts 104ᵃ. The motor shaft 105 is vertical and carries a drive pulley 106 at its upper end.

Adjacent to the shaft 105 is a vertical shaft 110, journalled in a bearing 111 in the top arm 3, for driving parts other than the spindle. This shaft carries a pulley 112 in line with the pulley 106.

Between the shaft 110 and the upper spindle 52 (Figures 2 and 32), two bosses 113 are formed on the partition 61 and have mounted thereon ball bearings 114 fitted in idler pulleys 115 located adjacent to the plane of pulleys 106 and 112. Headed screws 116 hold both the bearings 114 and the pulleys 115 on the bosses.

The upper spindle 52 has a main drive pulley 117 splined thereon at 118 and in line with pulleys 106 and 112. A V-belt 119 is trained around the pulleys 106, 112, 115 and 117. A ball bearing 120 is fitted in the pulley 117 and seated on a collar 121 formed on the bearing 60. In the top of the pulley 117 is fitted an oil retainer 122.

A housing consisting of a horizontal transverse portion 125 and a lateral portion 126 extending horizontally therefrom at an angle of 60° is secured on the column 2 by a gib 127 (Figure 14) and contains mechanism for injecting nuts from the track 27 into a socket wrench carried by the spindle, as will presently be shown. The housing cover is formed by a plate 128 and a bearing bracket 129 (Figure 3) enclosing the lower spindle 67. The bracket contains lubricating bushings 130 in which the lower spindle is journalled. A spindle guard 131 extends from the bracket 129 to the top arm 3. The bracket 129 is formed with an oil passage 132 extending from its upper surface to the space 133 between the bushings 130.

In the lower portion of the bracket 129 is inserted a lower spindle stop 135 loosely surrounding the lower spindle. The bracket 129 is slit horizontally at 136 above the stop 135 and vertically at 137 downward from the slit 136 to form a clamp for the stop, which is secured by a clamp screw 138 crossing the slit 137. The lower end of the stop 135 is formed as a toothed clutch face 139 (Figure 10).

On the exposed lower end of the lower spindle is screwed a socket bit adapter and stop 140 having its upper end formed as a toothed clutch face 141 adapted to engage with the face 139. The lower end of the adapter 140 has a square broached hole 140ª to hold the wrench comprising a bit 142 having its lower end formed as a socket 143 shaped to receive the particular size of nut being handled. The adapter 140 is slotted at 140ᵇ to receive a spring clip 140ᶜ. The clip engages in a slot 142ª in the socket bit 142 to retain the bit in the hole 140ª. Along the bit 142 are formed slots 144 with a hole 145 drilled from the upper portion of each slot radially to the center of the bit. In each slot is laid a flat bowed spring 146 having its upper end bent at 147 and inserted in a hole 145. The lower end is bent at an angle at 148 adjacent to the socket 143. A sleeve 149 encloses the bit and springs and projects the ends 148 into the socket.

The center line of the spindle is offset laterally from the discharge end of the track 27, as shown in Figures 17 and 22.

The nut injecting mechanism is contained principally in the housing portion 126 while the drive mechanism is contained in the portion 125. The injecting mechanism includes a nut positioning slide 150 (Figures 17, 21 and 27) and a nut injector slide 151 disposed respectively beneath and above a guide block 152 fixed within the portion 126. To the slide 150 is attached, by lock screws 153, an angular extension arm 154 terminating adjacent to the slide 151. One end of the slide 151 carries a pin 155 on which is mounted a roller 156. The adjacent end of the extension arm 154 carries a similar pin 157 on which is mounted a ball bearing or roller 158. The rollers 156 and 158 are engaged by cams in order to actuate the slides. The cam mechanism is described below.

The guide block 152 has a cavity 160 in which is slidably mounted a return spring plunger 161 bearing against the extension arm 154. A compressed return coil spring 162 is seated in the cavity 160 and in the plunger.

The forward end of the positioning slide 150 is slotted at 163 and has a bell crank nut injector lever 164 pivotally mounted in the slot on a pin 165. The forward wall 166 of the housing portion 126 is relieved at 167 to permit the slide 150 to be projected therethrough.

Upon the forward end of the slide 150 is secured a block 170 (Figure 27) by means of screws 150ª and dowels 150ᵇ, as shown in Figure 27. Adjacent to and spaced from the block 170 a guide block 171 is fastened to the housing section 126 and is undercut at 172 to receive a complementary guide block 173 lying contiguous to the block 170. On the block 173 is mounted a front nut clamp block 174 secured to the block 173 by screws 175 to slide therewith. The block 170 is also received in an undercut notch 176 across the discharge end of the track 27 at the bottom thereof.

The block 174 (Figure 17) is spaced from the discharge end of the track 27 by the width of a nut 180. From the block extends a jaw 174' adapted to travel across said end and shaped at 174" to engage about a third of the periphery of the nut. Between the track and the block 174, a complementary jaw 181 is fixed to the block 170 by screws 182. The nut-engaging end 181' of the jaw 181 is shaped to engage a portion of the nut and yet aline with one side of the trough of the track 27. In the retracted position of the positioning slide 150, the jaw surface 174" registers with the opposite side of the trough and the body 174 of the jaw abuts the front plate 166 of the housing portion 126, forming a space that receives a nut loosely. A spring 183 joining the body 174 to the block 181 draws the body against the plate 166, and the body 174 is so dimensioned that the surface 174" thereof is then registered as above set forth.

A nut injector 185 (Figures 22 and 27) is pivotally attached to the forward end of the lever 164 by a pin 186 and passes through the block 170 into the space between the jaw surfaces 174" and 181'. The block 170 and the attached jaw 181 travel rigidly with the slide 150, while the jaw block 174 has a yielding motion due to its guided support by the blocks 171, 173 and its spring connection to the jaw 181.

At the forward end of the housing portion 126, a rocker arm 190 is fixed on a pivot pin 191 journalled horizontally in the housing. One end of the rocker arm lies forward of the slide 151 and is engaged by a pin 192 (Figures 20, 22 and 27) slidably mounted in the slide 151 and backed by a coil spring 193. The other end of the rocker arm carries an adjustable set screw 194 locked by a nut 195 and adapted to engage the upper end of the injector lever 164 when the latter is advanced by the slide 150. A flat spring 196 between the block 170 and the lower arm of the lever 164 holds that arm and the injector 185 in the depressed position. A torsion spring 197 around the pin 191, with its ends anchored to the pin and housing, holds the upper end of the rocker arm 190, against pin 192 thereby returning the injector slide 151 to the retracted position after each cycle.

The general operation of the injector mechanism may be understood without a description of the slide actuating mechanism. With both slides 150 and 151 retracted, the jaw block 174 is stopped against the housing plate 166, and the jaw faces 174" and 181' are registered with the track trough sides as already set forth. An oversized pocket to receive a nut 180 from the track is thus provided, as shown in Figure 17.

The positioning slide 150 is first advanced by cam action. A shoulder 198 (Figure 17) on the jaw 181 engages the jaw block 174 when the faces 174" and 181' have closed against the contained nut. Thereafter, the jaws advance together towards the laterally offset spindle. The actuating mechanism is designed to hold the jaws momentarily at rest when the nut is directly under the socket wrench 142.

In this interval the injector slide 151 is advanced. The pin 192 strikes the upper end of the rocker arm 190, and the set screw 194 at the lower end strikes the lever 164. The injector 185 is thus elevated, transferring the nut from the jaws into the socket 143 of the wrench 142. If for some reason the socket 143 is already loaded, motion is absorbed in the spring 193 and the mechanism is thus protected from damage.

A vertical cam shaft 200 (Figure 27) is journalled approximately at the juncture of the housing portions 125, 126. The cam shaft carries cams 201 and 202 engageable respectively with the rollers 156 and 158. The rise of the cam 202 is a constant radius arc 203 of about 60°, causing the positioning slide 150 to dwell correspondingly in the projected position while the injector lever 164 is actuated. The rise of the cam 201 is substantially a point 204, so that the action of the injector parts is relatively abrupt.

The drive of the cam shaft 200 is effected through an intermittent clutch embodying a driver or body 205 to which is secured a worm gear 206 (Figure 23).

The worm gear and clutch driver are propelled from the motor driven shaft 110 through an extension 207 (Figure 28) keyed at 208 in alinement therewith at its lower end and journalled in ball bearings 209 in the top and bottom of the housing 126. A worm shaft 210 journalled in ball bearings 211 in the housing 126 lies perpendicular to the cam shaft 200 and carries a worm 212 meshing with the worm gear 206. Meshing bevel gears 213 and 214 are secured respectively on the shafts 207 and 210.

The clutch body 205 is loose on its shaft 200 and is formed in one end with an axial recess 215 (Figure 23). At this end is mounted a cage comprising a plate 216 from which spaced fingers 217 extend into the recess. Rollers 218 are inserted between adjacent fingers. The fingers and rollers are spaced from the cam shaft 200, and in the space is disposed a trip cam 219 keyed to the cam shaft at 220 and having peripheral flats 221 at the rollers. A collar 222 adjacent to the plate 216 is secured to the shaft 200 and is resiliently connected to the plate by a tension coil spring 223 having its ends fastened respectively to the collar and plate. The spring tends to rotate the cage 216, 217 and wedge the rollers 218 between the body 205 and the flats 221, thereby establishing a driving connection between the body 205 and the cam shaft 200. The cage plate 216 carries a pin 224 which may be engaged to turn the cage sufficiently to bring the rollers 218 into a non-wedging position on the flats 221 and thereby unlock the body 205 from the shaft 200. The mechanism for thus controlling the operation of the clutch will presently be described.

The connection between the worm gear 206 and the clutch body 205 is preferably frictional. For this purpose, a frictional thrust ring 225 is placed against the outer surface of body 226 of the worm gear, and adjacent thereto the end of the clutch body is reduced and threaded at 227. A retaining ring 228 with spring seats 229 is placed against ring 225, and adjacent thereto a tensioning ring 230 with similar seats 231 is screwed on the threaded end of the clutch body. The seats of the rings 228 and 230 are brought into opposed relation, and each pair of opposed seats receives a coil spring 232. The tension of the springs is adjusted by turning ring 230. The ring 230 may be split at 234 and locked by a screw 235 across the split.

Adjacent to the pedal operated actuating rod 35 is a rock shaft 240 (Figure 29) mounted to oscillate in bearings 241 in the top arm 3. On the upper end of the rock shaft is secured a laterally extending arm 242 (Figure 30) by set screws 243. The arm 242 has a vertical slot 244 in which is inserted a cam member consisting of a block 245 (Figure 32) and a laterally extending cam piece 246. The lower surface of the cam piece is cut at an angle of about 45° to form an inclined face 247 facing head 34. The cam member is adjustably secured in the arm 242 by set screws 248.

The head 34 is formed with a slot 250 (Figure 30) extending horizontally and longitudinally therethrough. In the slot is mounted a slide 251 adjustably secured by a pair of headed screws 252 passing through coinciding longitudinal slots 253 in the slide and head 34.

The slide 251 is formed at one end with a lateral pocket 254 in the exposed surface. In pocket 254 a dog 255 is pivotally mounted on the slide 251 by means of a shoulder screw 256. The bottom of the dog bears upon the slide 251 under the action of a flat spring 257 fastened to the head 34. The free end or nose of the dog is sloped at 258 in a plane parallel to that of the cam surface 247.

The cam piece 246 is normally drawn towards the head 34 by a return spring 259 extending from a pin 260 on the arm 242 to a fixed stop bracket 261 in the machine housing. This movement is adjusted and limited by a stop screw 262 adjustably locked in the stop bracket by a nut 263 and engaged by a bumper 264 on the arm 242.

In the operation of this portion of the mechaism, downward movement of the head 34 under the action of the pedal 40 and rod 35 causes the dog 255 (Figure 30) to swing upward against the stationary cam piece 246 until it clears the edge thereof and is snapped beneath it by the spring 257. This movement brings the surface 258 into engagement with the cam surface 247. On the return or upward stroke of the head 34 by the spring 47, the dog 255 is stopped against downward movement by a shoulder 259 on the arm 242, and the cam action of the surfaces 247 and 258 swings the arm 242 and turns the shaft 240. When the surface 258 rides off the surface 247, the shaft and arm are returned to their initial position by the spring 259.

The rock shaft 240 has an extension 265 (Figure 28) keyed thereto at 266 and journalled at 267 in the housing 126. To the extension 265 is secured a clutch trip arm 268 carrying at its free end a stop screw 268' adapted to strike a side of the housing 125 and adjusted by a lock nut 269.

Between the free end of the arm 268 and the clutch pin 224 is mounted a clutch stop arm 270 (Figures 14 and 28) on an intermediate pivot pin 271. The end of the arm at the pin is formed with a seat 272 to engage and arrest the pin 224. The end adjacent to the trip arm 268 is formed with a button 273 engaging the trip arm, and the engagement is maintained by a flat spring 274 secured to the arm 270 and bearing against the adjacent wall of the housing 126. It is now evident that the cam-induced movement of the shaft 240 and extension 241 swings the arm 270 away from the clutch pin 224, whereupon the clutch spring 223 throws the clutch into engagement.

The co-ordinated operation of the machine is as follows:

The motor 100 (Figure 2) is started and the upper spindle 52 is driven thereby through the pulleys 112, 117 and belt 119. The spindle lever 33 is elevated by the spring 47 and with it the head 34 and the entire spindle. The wrench stop 135—140 is engaged to lock the wrench against rotating. The hopper 26 is rotated preferably by another motor.

Pressure on the pedal 40 lowers the lever 33 and parts carried thereby. The wrench stop is disengaged, permitting the lower spindle 67 to be driven on engagement of the spindle clutch. The dog 255 rides idly over the cam piece 246 and falls into engagement with the cam face 247.

On release of the pedal, the upstroke of the lever 33 effects a cam action of the dog 255 on the cam face 247, and the rock shaft 240 is turned on its axis against the force of its return spring 259. The shaft extension 265 turns the trip arm 268 against the clutch stop arm 270, removing the latter from the clutch pin 224 and permitting the cam shaft clutch to engage and the cam shaft 200 to be driven from the shaft 100 through the gearing described above.

The cams 201 and 202 are so arranged on the cam shaft and with reference to their respective slides 151 and 150 that the latter are initially in the retracted position, so that the jaws 174' and 181 actuated thereby are alined with the track trough 27' to receive a nut 180, while the jaw block 174 is stopped against the front end plate 166 of the injector housing portion 126 to form an oversized nut pocket.

As the cam shaft 200 rotates, the positioning slide 150 is projected by its cam 202 while the cam 201 rides idly without contacting its roller 156. The jaw 181 engages the received nut 180 and pushes the jaw block 174 until the nut is positioned directly under the socket wrench 142.

The nut is maintained in this position during the dwell of the cam 202 corresponding to its constant radius arc 203. In this interval the upper spindle 52 rises sufficiently to disengage the spindle clutch 66—83 and engage the wrench stop 135—140.

In the stopped position of the wrench 142 its socket 143 is alined with the nut 180 therebeneath. In the same interval the rise 204 of the injector cam 201 throws the injector slide 151 to rock the levers 191 and 164, whereupon the injector 185 inserts the nut 180 into the socket 143.

The rising dog 255 then rides off the cam face 257, and the rock shaft 240, 260 is returned to its initial position by its spring 259, permitting the spring 274 to bring the lever 270 into the path of the pin 224 and disengage the cam shaft clutch. The upstroke of the spindle lever 33 is very rapid, since it is effected by the expansion of the coil spring 47. The operations occurring within the upstroke are, of course, of shorter duration, and the actual lift of the nut 180 into the socket 143 requires but a small fraction of a second.

The nut 180 is held in the socket 143 by the flat springs 144 in the wrench 142. At the next downstroke of the pedal 40, the wrench stop 135—140 is released, the spindle clutch is engaged, and the wrench is rotated.

The work may consist, for example, of a piece 280 (Figure 2) with one or more inverted screws 281 mounted therein. A suitable fixture may be employed to aline each screw with the wrench. The final downward movement of the spindle causes the wrench to turn the nut 180 on the alined screw. When the nut has been tightened to a tension predetermined by the pressure of the springs 90 on the friction plugs 87, the wrench becomes stationary and the housing 76 slips around the lower spindle 67. Upon the beginning of the upstroke of the spindle, the clutch housing 66 separates from the facing 83 separate, relieving the nut wrench of turning torque and allowing it to rise freely off the nut as the spindle proceeds on its upward stroke.

The next application of pressure on the pedal 40 introduces a repetition of the cycle.

Although a specific embodiment of the invention has been disclosed, it may be understood that various alterations in the details may be made without departing from the scope of the invention, as indicated by the appended claims.

What we claim is:

1. A nut positioning and transferring device comprising a frame work, a slide therein, means for guiding said slide in a straight line, means for advancing and retracting said slide along said guiding means, a pair of jaws carried by said slide, said jaws forming a nut-receiving opening between them, one of said jaws being fixed to the slide and the other being slidable relatively thereto, stop means on said frame work and engageable by the relatively slidable jaw in the retracted or loading position of said slide, to increase the spacing between the jaws for loading, said jaws having inner faces adapted to engage opposite faces of a nut, an injector pivotally attached to said slide and positioned to enter between said jaws in a direction transverse of the movement of said slide, and means on said frame work for operating said injector while said jaws are in the advanced position.

2. A nut positioning and transferring device comprising a frame work, a slide therein, means for guiding said slide in a straight line, means for advancing and retracting said slide along said guiding means, a jaw fixed to said slide, a complementary jaw slidably mounted on said slide and movable relatively to the fixed jaw, a spring joining said slidable jaw to said slide and tending to draw the slidable jaw toward the fixed jaw, said slidable jaw being engageable with a fixed part of said frame work in the retracted position of said slide, said part being positioned to maintain a space between said jaws and to tension said spring through the slidable jaw, said jaws having inner faces adapted to engage opposite faces of a nut, an injector pivotally attached to said slide and positioned to enter between said jaws in a direction transverse of the movement of said slide, and means on said frame work for operating said injector while said jaws are in the advanced position.

3. A nut positioning and transferring device comprising a frame work, a slide therein, means for guiding said slide in a straight line, means for advancing and retracting said slide along said guiding means, a jaw fixed to said slide, a complementary jaw slidably mounted on said slide and movable relatively to the fixed jaw, a spring joining said slidable jaw to said slide and tending to draw the slidable jaw toward the fixed jaw, said slidable jaw being engageable with a fixed part of said frame work in the retracted position of said slide, said part being positioned to maintain a space between said jaws and to tension said spring through the slidable jaw, a fixed chute communicating with the space between said jaws in the retracted position of the latter, said chute having a path narrower than said space between said jaws, for free passage of an article from said jaws into said space, said jaws having inner faces adapted to engage opposite faces of a nut, an injector pivotally attached to said slide and positioned to enter between said jaws in a direction transverse of the movement of said slide, and means on said frame work for operating said injector while said jaws are in the advanced position.

4. A nut positioning and transferring device comprising a frame work, a slide therein, means for guiding said slide in a straight line, means for advancing and retracting said slide along said guiding means, a pair of jaws carried by said slide, said jaws forming a nut-receiving opening between them, one of said jaws being fixed to the slide and the other being slidable relatively thereto, stop means on said frame work and engageable by the relatively slidable jaw in the retracted or loading position of said slide, to increase the spacing between the jaws for loading, said jaws having inner faces adapted to engage opposite faces of a nut, an injector in the form of a lever pivotally mounted on said slide and having one end adapted to enter between said jaws, a rocker pivotally mounted on said frame work and adapted to strike the other end of said lever, another slide in said frame work adjacent to said rocker, and means on said frame work for moving the last named slide into engagement with said rocker while the first slide is in the advanced position.

5. A nut positioning and transferring device comprising a frame work, a slide therein, means for guiding said slide in a straight line, means for advancing and retracting said slide along said guiding means, a jaw fixed to said slide, a complementary jaw slidably mounted on said slide and movable relatively to the fixed jaw, a spring joining said slidable jaw to said slide and tending to draw the slidable jaw toward the fixed jaw, said slidable jaw being engageable with a fixed part of said frame work in the retracted position of said slide, said part being positioned to maintain a space between said jaws and to tension said spring through the slidable jaw, said jaws having inner faces adapted to engage opposite faces of a nut, an injector in the form of a lever pivotally mounted on said slide and having one end adapted to enter between said jaws, a rocker pivotally mounted on said frame work and adapted to strike the other end of said lever, another slide in said frame work adjacent to said rocker, and means on said frame work for moving the last named slide into engagement with said rocker while the first slide is in the advanced position.

6. A nut positioning and transferring device as set forth in claim 1, further characterized by an expanded spring joining the relatively movable jaw to said slide and tending to draw said jaws together, whereby to reduce the spacing between the jaws when the relatively movable jaw disengages said stop means.

7. A nut positioning and transferring device as set forth in claim 4, further characterized by an expanded spring joining the relatively movable jaw to said slide and tending to draw said jaws together, whereby to reduce the spacing between the jaws when the relatively movable jaw disengages said stop means.

ROY W. BAILEY.
JOHN THOMAS FAULL.

REFERENCES CITED

The following references are of record in the file of this patent:

UNITED STATES PATENTS

| Number | Name | Date |
|---|---|---|
| 150,667 | Aiken | May 12, 1874 |
| 293,370 | Stedman | Feb. 12, 1884 |
| 768,811 | Mayo | Aug. 30, 1904 |
| 1,581,022 | Saylor | Apr. 13, 1926 |
| 1,677,238 | Kinney | July 17, 1928 |
| 1,697,740 | Turner | Jan. 1, 1929 |
| 1,708,215 | Chryst | Apr. 9, 1929 |
| 1,757,614 | Brown | May 6, 1930 |
| 1,766,139 | Myers | June 24, 1930 |
| 1,871,382 | Meyer | Aug. 9, 1932 |
| 1,921,485 | Seger | Aug. 8, 1933 |
| 2,009,751 | Stenman | July 30, 1935 |
| 2,068,076 | Rosenberg | Jan. 19, 1937 |
| 2,068,773 | Slider | Jan. 26, 1937 |
| 2,086,128 | Hackbarth et al. | July 6, 1937 |
| 2,255,827 | Snyder | Sept. 16, 1941 |
| 2,261,134 | Blair | Nov. 4, 1941 |
| 2,262,150 | Straw | Nov. 11, 1941 |
| 2,262,434 | Vanerstrom | Nov. 11, 1941 |
| 2,266,933 | Williams | Dec. 23, 1941 |
| 2,320,044 | Merriman | May 25, 1943 |
| 2,343,798 | Poupitch | Mar. 7, 1944 |
| 2,358,759 | Maude | Sept. 19, 1944 |